June 18, 1968  G. WOODS ETAL  3,388,749
FAN IMPELLERS

Filed Feb. 28, 1966 2 Sheets-Sheet 1

Inventors
Geoffrey Woods
William K. Peyto
By Guster H. Emery

June 18, 1968   G. WOODS ET AL   3,388,749
FAN IMPELLERS

Filed Feb. 28, 1966   2 Sheets-Sheet 2

Inventors
Geoffrey Woods
William K. Peyto
By Gustav H. Emery Atty.

United States Patent Office 3,388,749
Patented June 18, 1968

3,388,749
FAN IMPELLERS
Geoffrey Woods and William Kenneth Peyto, both of Peartree Road, Colchester, England
Filed Feb. 28, 1966, Ser. No. 530,430
Claims priority, application Great Britain, Feb. 26, 1965, 8,465/65
2 Claims. (Cl. 170—159)

This invention relates to a method of construction of fan impellers which is especially valuable for making axial flow impellers but which may also be used for centrifugal or mixed flow fans.

Small table-type fans have hitherto had the complete impeller, i.e., all the blades and the hub, made as a one piece moulding of plastics material, but such impellers are very lightly loaded and of low aerodynamic efficiency. The present invention is concerned with larger impellers in which the mechanical loading on the blades or wings is high, and a high aerodynamic efficiency is in view, requiring careful design and exact physical reproduction of the design in the actual impeller.

According to the invention a fan impeller is made up from a number of separate parts, at least some of which are premanufactured by moulding from reinforced plastics materials, the separate parts including the impeller blades or wings, the impeller boss or hub, and an insert for the boss or hub to fit a driving shaft, the parts being secured together by a compatible bonding resin to form a unitary structure.

Whilst the hub insert will normally be of metal, suitably steel, and be bored and provided with any desired keyway or the like, by means of which it can be secured to a driving shaft, the impeller blades and the boss or the parts making up the boss may suitably be of glass fibre reinforced resin. The impeller blades may then be manufactured very simply by the use of suitable moulds and can be of very accurate shape and size with a very good surface finish. Moreover, by using optimum conditions of temperature and pressure according to the materials employed, the blades can be made very strong but at the same time light in weight. Another advantage of moulding the blades in a plastics material is that they can be made to an accurate aerofoil or other desired section over their entire length which is not possible when they are cast or die cast in metal without subsequent machining and even then is not always possible. A still further advantage is that compared with metal, fatigue failure is much less likely if the blade suffers small local damage. Similar manufacturing methods may be used for the boss or the parts making up the boss and this may be formed with a coned seating which will accurately centre the hub insert. Recesses will also be provided to receive the blade roots and if desired these may be of dovetail, coned or similar form, which may be grooved to assist subsequent bonding.

In making an impeller from the premanufactured parts, these may be assembled in a jig which will ensure accurate disposition of the parts. The blade setting or stagger angle could be determined by the jig but is preferably determined by direct keying engagement between the blade root and the hub or still more preferably by making the blade roots figures of revolution and using premanufactured keypieces which are located in recesses in the hub and have keyed engagement with both the hub and the blades, prevent relative rotation between the hub and blades. A bonding medium which is the same as, or which is fully compatible with, the material of the premanufactured parts is used to secure the parts together in the jigged position, heat and/or pressure being applied according to the nature of the bonding material to obtain the strongest possible bond.

By the use of the invention great flexibility in design and construction can very simply be obtained. Different sizes of impeller blades can be used with the same or different sizes of boss and the stagger angle can be varied as desired. Thus the diameter of the boss may be matched to the diameter of the prime mover, a very desirable design feature leading to high efficiency. Hub inserts can also be provided to suit different shaft diameters and different kinds of keying permitting simple matching of the boss to the diameter and form of driving motor shaft. Thus, from a stock of relatively small number of standard parts large variety of impellers can be made and prime movers be selected.

The impellers can be made more efficiently than by integral moulding methods since the moulds are simple and the orientation of the reinforcement can be more rigidly controlled. Because of the greater strength and strength/weight ratio impellers can also be made having greater boss diameters and higher hub to tip ratios for use at greater speeds and higher pressure.

In one particular method of construction according to the invention the impeller boss is premanufactured as two disc shaped parts. These are provided with complementary recesses in which the blade roots are seated. The hub insert is secured in an axial recess at least one end of which may be coned to facilitate accurate centering of the insert. In assembling the parts to make an impeller the mating surfaces of the two parts making up the boss are coated with bonding agent, the hub insert and blades (coated with bonding agent if necessary) are placed in position and accurately adjusted by means of a jig and the whole is placed in a press or mould and cured under desired conditions of temperature and pressure. Alternatively, the two halves of the impeller boss are riveted together to hold the parts in a desired relationship. In any but very small sizes a bonding agent will be used as well as rivets.

If desired, a single part premoulding may be used for the boss and this may be in the form of a shell defining an internal cavity. This cavity may then be filled with bonding agent, with or without reinforcement and the recesses closed off by a mould plate for curing.

It is also possible to premould the blades in units of two or more, and if desired, these may be interconnected by reinforcing material, such as glass fibre cloth which is uncoated with resin. The connection thus remains flexible and allows the blades to be individually adjusted in the final assembly jig. The continuous nature of the reinforcement will then increase the strength of the finished impeller.

In order that the invention may be clearly understood some embodiments thereof will now be described by way of example only with reference to the accompanying diagrammatic drawing in which.

Figure 1:
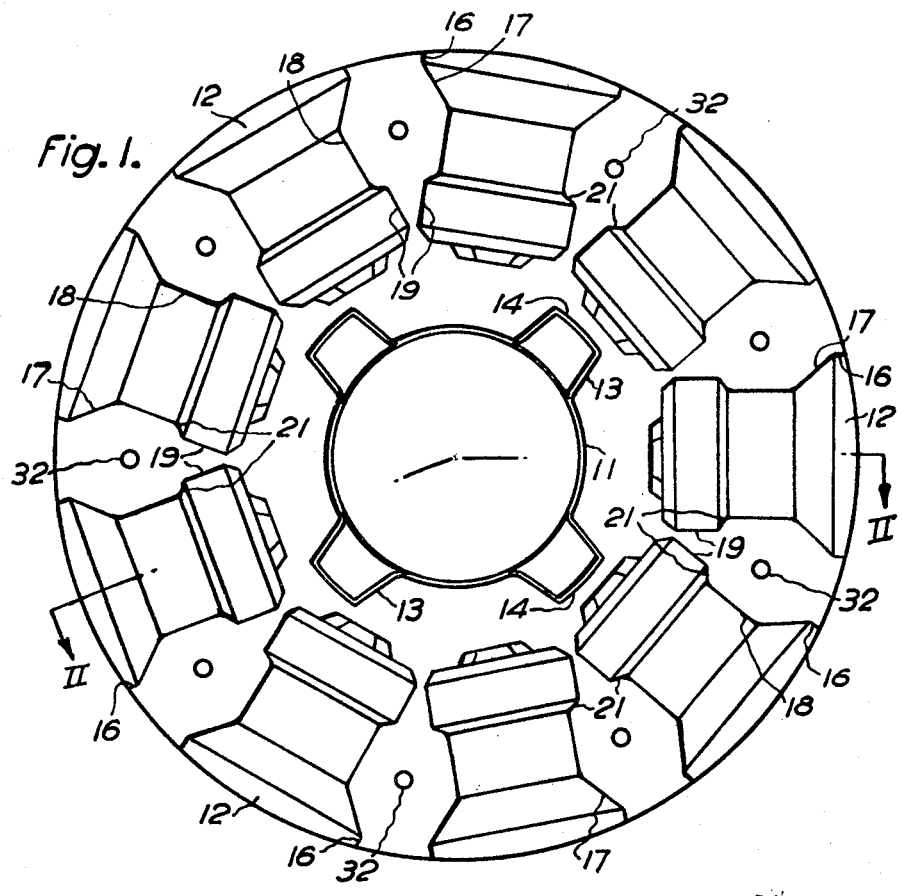
FIGURE 1 is an end view and FIGURE 2 is a section of a hub clamping plate or disc for use in accordance with the invention.
Figure 2:
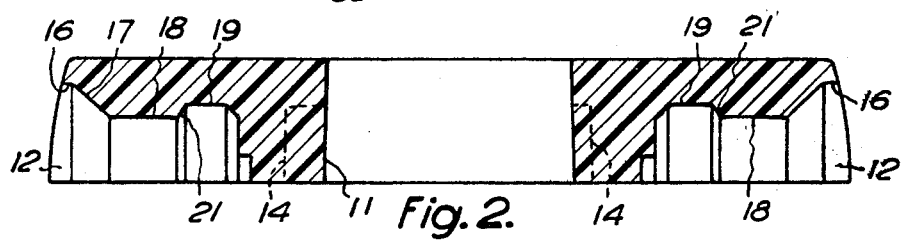

The hub clamping plate shown in FIGURES 1 and 2 of the drawings may be a moulding in glass fibre reinforced epoxy resin, and takes the form of a disc having a central aperture 11 and nine recesses 12 shaped to accommodate half the root portions of impeller blades. The central aperture 11 is straight sided, but is formed with four equispaced recesses 13, the radial outermost edges of which are coned to a slight extent. These coned surfaces 14 assist in accurately centering the impeller hub insert shown in FIGURE 6 which is formed with lugs 15 which are tapered to mate with the coned surfaces 14.

Each of the recesses 12 is identical, and when two clamping plates are juxtaposed each complete recess includes a cylindrical section 16 followed by a tapering portion 17, and a second cylindrical section 18. Radially inwardly from the second cylindrical section 18 an enlarged portion 19 is provided so as to form a shoulder 21 which will ensure that a blade will not be thrown from the boss by centrifugal force.

Figures 4, 5:
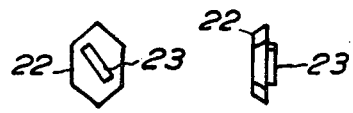
FIGURE 4 is a plan view and FIGURE 5 a side view of a key piece used for determining the setting or stagger angle of the blades.
Figure 3:
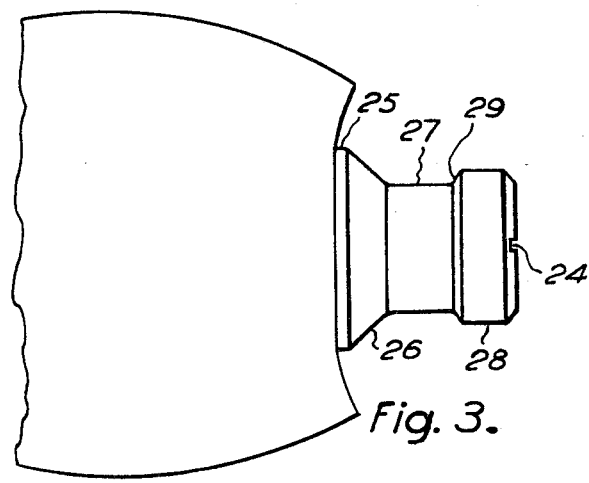
FIGURE 3 shows the root portion of an impeller blade for use with the hub clamping plate or disc shown in FIGURES 1 and 2.

The blade root is in the form of a figure of revolution so that the blade would be rotatable on the axis of the root. However, in the base of the recess a further recess is provided to accommodate keypiece 22, which serves to prevent relative rotation between the blade and the hub, so determining the setting or stagger angle of the blade. This requires that the keypiece should be prevented from rotating relative to the hub, and the blades relative to the key piece and could be achieved by a key and slot engagement between the hub and keypiece and a key and slot engagement between the keypiece and blade root. A more compact arrangement is obtained by making the keypiece of a noncircular portion, for example polygonal, a hexagonal form being shown in FIGURES 4 and 5, and a protuberance 23 of rectangular section over which engages matching slot 24 in the blade root. Also the sides of the keypiece are bevelled to enable the parts to be assembled as described later. The noncircular form is made such that the keypiece can only be inserted in a position which gives the blade the correct angle. Thus the hexagonal form shown is symmetrical but not regular and the keypiece can now be inserted in two positions either of which will be correct. The matching hexagonal recess is formed half in each clamping plate so that the two clamping plates are identical and the axis of the recess is coaxial with the blade root. The use of separate keypieces enables the blades to be standardised, a selection of keypieces being provided for different stagger angles.

Each blade or wing of the impeller is formed with a root having a first cylindrical portion 25 to mate with the portion 16 of the recess in the clamping plate, a coned portion 26 to mate with the portion 17, a second cylindrical portion 27 to mate with the portion 18, and an enlargement 28 forming a shoulder 29 to fit within the space 19 and to engage the shoulder 21. The slot 24 above mentioned engages the protuberance 23 of the keypiece.

The remainder of the blade or wing may be of conventional form, but as has already been pointed out, it may be of complete and true aerofoil or other desired section. This is made possible by the fact that it is moulded from a material such as glass fibre reinforced polyester resin, whereas it is well known that blades which are cast or die-cast in metal cannot usually be of exactly the desired section without subsequent machining, and not always even then.

Figure 6:
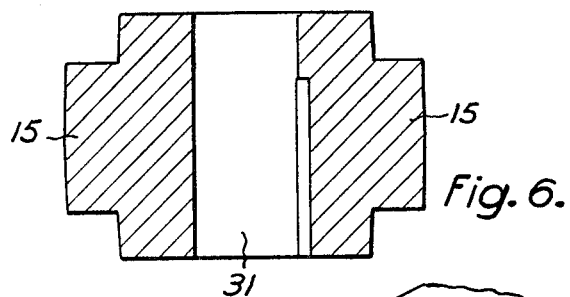
FIGURE 6 is a section of an impeller hub insert.

FIGURE 6 shows a section of a hub insert which will usually be machined from metal and which fits into the aperture 11 in the clamp plates. It is of cylindrical form and is axially bored at 31 to match any shaft upon which the impeller is to be fitted, the necessary keyways or other locking means being provided as desired. Four lugs 15 are provided to fit into the recesses 13 in the clamp plates and these are slightly coned to ensure that they are accurately centered in the clamp plates. At the same time, the lugs serve to distribute the stress exerted on the clamp plate in driving the impeller.

In assembling an impeller from the parts shown in the drawings, one clamp plate is placed upon a suitable support and the whole of its top surface and the whole of the interior of the recesses 11 and 12 are coated with a suitable bonding agent. A suitable hub insert, having a desired shaft bore and keyway arrangement is then coated with bonding agent and inserted into the axial aperture in the clamp plate. The appropriate number of keypieces and blades or wings of a desired length are then inserted into the recesses 12 after coating the keypieces and root portions with bonding agent, care being taken to ensure that the slots 24 mate with the protuberances 23. The bevelling of the sides of the keypieces enables the keypieces and blades to be manipulated into position although in general the protuberances 23 when assembled are not parallel to the axis of the clamp plate. The second clamp plate is then coated with bonding agent, placed over the top of the first and pressed into position. In this example the entire assembly is then secured together by means of countersunk rivets passed through the apertures 32 and the whole is then cured. By selecting keypieces of a desired angle, blades of a desired length, clamp plates of a desired diameter, and a hub insert having a desired shaft size and key formation, a wide selection of different impellers can be made from a relatively small stock of moulded parts.

Figure 7:
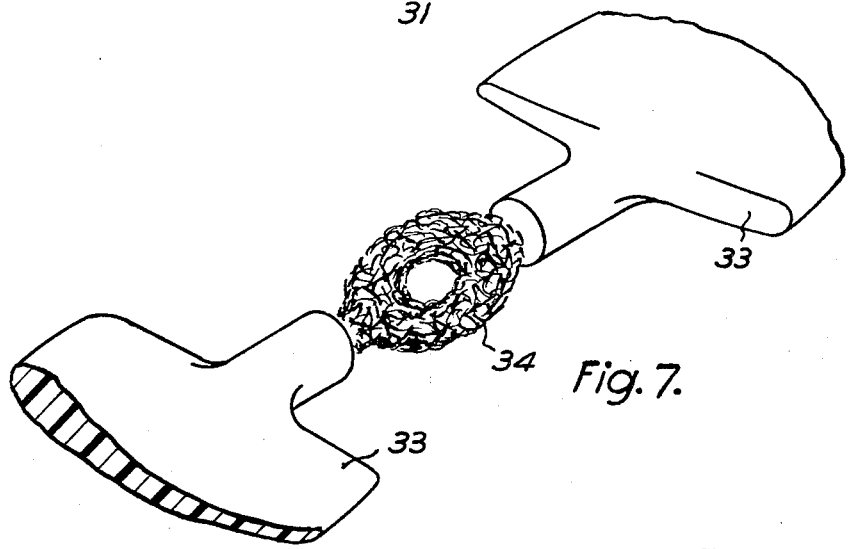
FIGURE 7 is a sketch showing an alternative impeller blade arrangement.

In the alternative arrangement shown in FIGURE 7, the blades 33 are premoulded in pairs with the reinforcement 34 longitudinally of each blade. At this stage the reinforcement extends between the two blades of the pair and is not impregnated with the moulding resin in this region. Then when the blades are assembled into an impeller the reinforcement extending between them serves to reinforce the resin bonding the parts together and to increase the strength of the completed structure.

Variations of the scheme of reinforcement extending from the mould during premoulding are possible. Thus for example the reinforcement could extend from each separate blade, or it might join two blades not in line as in FIGURE 7, but which when assembled are at an inclination one to the other, or it might join even more than two blades. Blades so connected by reinforcement could moreover be used in a two-piece or one-piece boss. Also reinforcement could extend from other premoulded parts than blades, for instance the shell forming the boss, or the clamping plates or discs and it might extend between the two latter, being of sufficient length to permit assembly while not being too bulky to prevent assembly.

What we claim is:

1. A method of constructing a fan impeller from a plurality of premanufactured blade and hub parts, each blade part having a root portion contoured to permit establishment of a predetermined stagger angle of such blade in the fan impeller, and said hub parts including at least one dish-shaped part having recesses therein for the reception of the root portions of said blade parts and also including a plurality of keypieces each contoured to coact with the contour of a blade root portion and with a recess in said dish-shaped part, said method comprising positioning one said dish-shaped hub part, locating each of said blade parts with the root portion thereof and one of said keypieces in a recess in said dish-shaped hub part so that the blade assumes a desired stagger angle, and securing a further dish-shaped hub part to said first mentioned dish-shaped hub part to entrap said root portions and keypieces immovably within the hub formed by said two dish-shaped hub parts so that the blade assumes a desired stagger angle, and securing a further dish-shaped hub part to said first mentioned dish-shaped hub part to entrap said root portions and keypieces immovably within the hub formed by said two dish-shaped hub parts with the blades fixed in the stagger angle determined by the keypieces.

2. A method according to claim 1, in which the step is included of applying a bonding material to each of said premanufactured blade and hub parts prior to assembling such parts together so that such parts become secured together into a unitary structure upon said bonding material setting and bonding the parts one to another.

(References on following page)

References Cited

UNITED STATES PATENTS

| | | | |
|---|---|---|---|
| 2,857,094 | 10/1958 | Erwin | 230—134 |
| 1,463,153 | 7/1923 | Clay | 170—159 |
| 2,732,423 | 1/1956 | Morrison | 230—134 |

FOREIGN PATENTS

| | | |
|---|---|---|
| 575,578 | 2/1946 | Great Britain. |
| 1,079,271 | 4/1960 | Germany. |
| 938,577 | 10/1963 | Great Britain. |

EVERETTE A. POWELL, Jr., *Primary Examiner.*